UNITED STATES PATENT OFFICE.

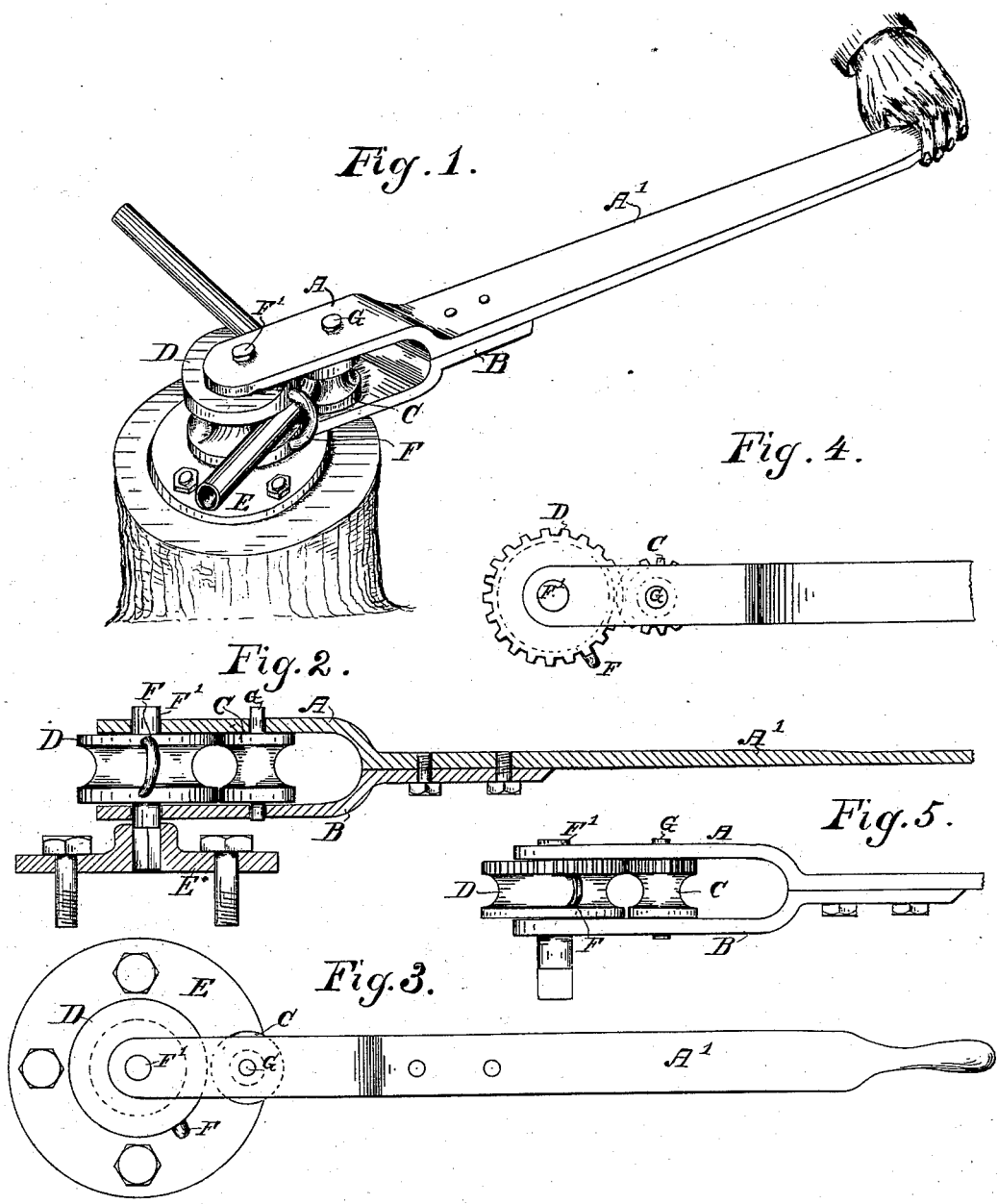

SAMUEL STEPHENS, OF INDIANAPOLIS, INDIANA.

TUBE-BENDING MACHINE.

SPECIFICATION forming part of Letters Patent No. 268,050, dated November 28, 1882.

Application filed April 20, 1882. (No model.)

*To all whom it may concern:*

Be it known that I, SAMUEL STEPHENS, of Indianapolis, Indiana, have invented a new and useful Improvement in Tube-Bending Machines, of which the following is a description, reference being had to the accompanying drawings, in which like letters indicate like parts.

Figure 1 is a perspective view of my machine, which consists of a yoke formed of two pieces, A and B, united together, one part of which is conveniently extended to form a handle or lever, A'. In this yoke are fixed two grooved rollers or sheaves, C and D, of different sizes, the largest of which, D, is rigidly attached to its axle F', Fig. 2, the lower end of this axle being squared and fitting closely into a base, E, which is in turn securely affixed to a support or block. A strap or staple is also attached to the roller D, as indicated at F, Fig. 1. The smaller roller, C, moves freely upon its axis G, Fig. 2, and the yoke carrying the roller C swings freely round the axis at the bearings F'.

Fig. 2 is a longitudinal section of the machine, or rather of the yoke, lever, and base-plate E, showing how the rollers are mounted. Fig. 3 is a top view. Fig. 4 is a top view illustrating another method of working the rollers—gearing them together—of which Fig. 5 gives a side view. Instead of this method of using gears or cogs upon the rollers, cog-wheels might be placed upon the outer side of the yoke A, upon the axes F' and G, and produce a similar result.

The machine may be used with plain rollers, as shown in Fig. 1, or cog-wheels may be used upon the outside, (not shown,) or the edge of the rollers may be cogged, as shown in Figs. 4 and 5. I preferably employ cogged rollers, as shown in Fig. 5.

To operate my machine, the rollers are so adjusted that the strap F shall be turned toward the lever or handle A' and nearly or quite in line with it. When in this position the outer or convex side of the strap or staple will fit more or less closely into the groove of the roller C. The pipe to be bent is then passed between the rollers and through the staple F, which serves to hold it firmly, and the operator, by means of the lever A', draws the yoke toward him, as shown in Fig. 1, and the pipe is bent around the roller D, fitting into its groove or channel. I find upon experiment that it is better to have the groove in the roller D a little deeper than the one in roller C, and deep enough to take in more than half the diameter of the pipe. The pipe or tube bends better than when the channels are shallower or equal in both rollers.

My machine is especially adapted to making return-bends in coils of pipe, but may be used for bending tubes for other purposes.

What I claim, and desire to secure by Letters Patent, is—

1. The yoke A B, having a suitable lever or handle, in combination with the grooved rollers C and D and the staple F, substantially as and for the purpose specified.

2. The yoke A B, in combination with the two grooved rollers C and D, the latter having cogs to engage each other within the yoke, and the staple F, substantially as described.

3. The yoke A B, inclosing grooved rollers, so arranged that the one shall revolve around the periphery of the other with the yoke, the grooves forming a circular opening between the rollers, in combination with the staple F and means for operating the same, as and for the purpose described.

In witness whereof I have hereunto set my hand this 7th day of April, 1882.

SAMUEL STEPHENS.

Witnesses:
C. P. JACOBS,
ISRAEL HOGELAND.